United States Patent
Okada et al.

(10) Patent No.: US 8,163,420 B2
(45) Date of Patent: Apr. 24, 2012

(54) BATTERY SYSTEM WITH BATTERY CELLS HELD IN A STACK BY METAL BANDS

(75) Inventors: Wataru Okada, Kobe (JP); Shinsuke Nakamura, Kasai (JP); Tomoyuki Ohmura, Kakogawa (JP); Akinobu Wakabayashi, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 180 days.

(21) Appl. No.: 12/639,387

(22) Filed: Dec. 16, 2009

(65) Prior Publication Data

US 2010/0167115 A1      Jul. 1, 2010

(30) Foreign Application Priority Data

Dec. 27, 2008    (JP) .................................. 2008-335517

(51) Int. Cl.
*H01M 2/14*    (2006.01)
*H01M 2/18*    (2006.01)

(52) U.S. Cl. ......... 429/148; 429/149; 429/163; 429/186

(58) Field of Classification Search ........................ None
See application file for complete search history.

(56) References Cited

U.S. PATENT DOCUMENTS

| | | | |
|---|---|---|---|
| 4,065,603 A * | 12/1977 | Coibion ........................... | 429/99 |
| 5,070,579 A | 12/1991 | Hirabayashi | |
| 5,456,994 A * | 10/1995 | Mita ............................... | 429/71 |
| 5,747,186 A * | 5/1998 | Morishita et al. ............... | 429/53 |
| 5,761,774 A | 6/1998 | Champi | |
| 5,766,801 A * | 6/1998 | Inoue et al. ..................... | 429/99 |
| 2002/0160258 A1* | 10/2002 | Lee et al. ....................... | 429/130 |
| 2003/0118898 A1 | 6/2003 | Kimura et al. | |
| 2008/0280194 A1 | 11/2008 | Okada | |
| 2009/0053585 A1 | 2/2009 | Nakazawa | |

FOREIGN PATENT DOCUMENTS

| | | |
|---|---|---|
| EP | 0 771 037 | 5/1997 |
| EP | 1 081 784 | 3/2001 |
| EP | 1 091 426 | 4/2001 |
| EP | 1 091 438 | 4/2001 |

(Continued)

OTHER PUBLICATIONS

European Search Report (in English language) issued Sep. 15, 2008.

*Primary Examiner* — Barbara Gilliam
*Assistant Examiner* — Kwang Han
(74) *Attorney, Agent, or Firm* — Wenderoth, Lind & Ponack, L.L.P.

(57) ABSTRACT

A battery system has a battery block with a plurality of battery cells that are rectangular batteries stacked with intervening insulating separators, and that battery block is held by fastening components. The fastening components are provided with a pair of endplates disposed at the ends of the stacked battery cells, and metal bands on both sides of the battery block connected at both ends to the endplates. An insulating separator has an insulating plate section, which intervenes between adjacent battery cells, and insulating walls, which cover both battery cell side-walls, formed from plastic as a single-piece. In this battery system, insulating plate sections are sandwiched between battery cells, and the insulating walls are disposed between battery cell outer side-walls and metal bands to insulate the battery cells from the metal bands.

20 Claims, 13 Drawing Sheets

FOREIGN PATENT DOCUMENTS

| | | |
|---|---|---|
| EP | 1 150 364 | 10/2001 |
| EP | 1 619 740 | 1/2006 |
| JP | 3-32364 | 3/1991 |
| JP | 5-343105 | 12/1993 |
| JP | 2001-507856 | 6/2001 |
| JP | 2004-227788 | 8/2004 |
| JP | 2008-282582 | 11/2008 |

* cited by examiner

BATTERY SYSTEM WITH BATTERY CELLS HELD IN A STACK BY METAL BANDS

BACKGROUND OF THE INVENTION

1. Field of the Invention

The present invention relates to a battery system with a plurality of battery cells, which are rectangular batteries, held in a stack by fastening components.

2. Description of the Related Art

As shown in FIG. 1, a battery system with a plurality of stacked battery cells, which are rectangular batteries, has a pair of endplates 905 connected by bolts 906 to dispose batteries 901 in a stack between the endplates 905. (Refer to Japanese Laid-Open Patent Publication No. H03-32364A (1991).) In the battery system cited in JP H03-32364A as shown in FIG. 1, the endplates 905 are provided with lateral protrusions 908 on both sides for insertion and connection of the bolts 906. The bolts 906 are inserted through the lateral protrusions 908 and nuts 907 are threaded onto the ends to hold the endplates 905 in place. A battery system with this structure has the drawback that depending on operating conditions, battery performance can deteriorate. In particular, this type of battery system has the drawback that since lithium ion batteries are used as the rectangular batteries, depending on operating conditions, battery internal resistance can increase and reduce output. This is because the lateral protrusions can easily deform and expansion of battery external cases cannot be reliably prevented. In a lithium ion battery, internal battery electrode elements can expand during overcharging or during normal charging and discharging resulting in wider separation between positive and negative electrodes. If this condition occurs, the distance ions, which move between positive and negative electrodes, must traverse increases and internal resistance increases. In particular, compared to other batteries such as nickel cadmium batteries, lithium ion batteries have large internal resistance per area of the opposing electrodes. To reduce internal resistance, lithium ion battery positive and negative electrode plates are made thin, the gap between the electrodes is reduced, and opposing electrode area is increased. Since the gap between positive and negative electrodes is narrow to reduce internal resistance, the internal resistance can become large even if electrode expansion results in only a small increase in the gap between electrodes. If the internal battery resistance becomes large, the amount of current that can be extracted is lowered and the power output is also reduced. Since a battery system with a plurality of stacked rectangular batteries is used in applications demanding high output such as in an automobile, reduction in output is a serious drawback.

Further, the battery system of FIG. 1 has the drawback that if the rectangular batteries 901 expand, the bolts 906 can contact the sides of the rectangular batteries 901. This is because if the rectangular batteries 901 expand and the lateral protrusions 908 bend inwards, bolts 906 inserted through those lateral protrusions 908 will curve inwards. In the stack of rectangular batteries, there is a potential difference between the external cases of adjacent batteries. Consequently, if a bolt contacts a plurality of rectangular battery external cases, short circuit current flow will detrimentally affect the batteries and compromise safety.

A battery system with stacked batteries held by metal bands instead of bolts has been developed. (Refer to Japanese Laid-Open Patent Publication No. H05-343105A (1993) and 2001-507856A.)

In JP H05-343105A, metal bars are provided at both ends of a stack of rectangular batteries, and metal bands are fastened at both ends to those metal bars via set screws. In a battery system of this structure, the metal bars can easily deform with rectangular battery expansion, and it is difficult to reliably prevent rectangular battery expansion and battery performance degradation. JP 2001-507856A cites a battery system provided with a pair of end-panels disposed at the ends of a stack of rectangular batteries, and metal bars are welded to those end-panels to hold the stack. This battery system has the drawback that since the metal bars are attached by welding, it is difficult to hold the rectangular batteries with a properly adjusted amount of compression.

To correct the drawbacks described above, the present applicant developed the battery system shown in FIG. 2. (Refer to Japanese Laid-Open Patent Publication No. 2008-282582A.) This battery system is provided with a battery block 92 having a plurality of stacked battery cells 91 that are rectangular batteries, and fastening components 93 that hold the battery cells 91 of the battery block 92. The fastening components 93 are in turn provided with a pair of endplates 94 disposed at the ends of the battery cell 91 stack, and metal bands 95 that connect the ends of the battery cell 91 stack and retain it in a compressed state.

The battery system described above holds a stack of rectangular batteries in an ideal state with the pair of endplates and metal bands, and can prevent battery performance degradation during use. In particular, by disposing the metal bands close to battery block surfaces, namely by disposing the metal bands in close proximity to battery cell outer side-walls, endplate size can be essentially equal to the outline of a battery cell and the endplates can be solidly fastened with the metal bands. In addition, by minimizing metal band and endplate protrusion from the battery block, battery system outline can be made compact.

However, this battery system has the drawback that the metal bands can easily contact and short circuit battery cell outer side-walls. This is because the metal bands are put in close proximity to battery cell outer side-walls to achieve the excellent characteristics described above. A battery system with stacked battery cells is not used with all the battery cells connected in parallel, but rather has series-connected battery cells to increase output voltage. A voltage difference arises between the external cases of adjacent battery cells that are connected in series. The external case of a battery cell is connected to the positive or negative electrode, or it is not connected directly to an electrode and attains a potential between that of the positive and negative electrodes. For example, for a lithium ion battery used as a battery cell, the external case assumes a potential that is intermediate to that of the positive and negative output terminals. This is because the external case connects to the positive and negative electrodes through the electrolyte solution. Since there is a voltage difference between adjacent battery cells, if a metal band in close proximity to the outer side-walls contacts those external cases, a large short circuit current will flow. Further, if an external case contacts a metal band, it can cause leakage current.

The present invention was developed with the object of further correcting the drawbacks described above. Thus, it is an important object of the present invention to provide a battery system that can reliably prevent short circuits between the outer side-walls of battery cells and the metal bands while putting the metal bands in close proximity to battery cell outer side-walls. It is another important object of the present invention to form insulating walls, which insulate the metal bands from battery cell outer side-walls, in single-piece construction with the insulating separators, which are made of plastic and insulate adjacent battery cells; and thereby provide a battery system that can reliably insulate the metal bands from the battery cells by disposing the insulating walls in proper positions, without shifting position, via the insulating separators.

BRIEF SUMMARY OF THE INVENTION

The battery system of the present invention is provided with a battery block 2 having a plurality of stacked battery cells 1 that are rectangular batteries, plastic insulating separators 15 sandwiched between the battery cells 1 that make up the battery block 2 to insulate the series-connected battery cells 1, and fastening components 3 that hold the battery cells 1 of the battery block 2. The fastening components 3 are in turn provided with a pair of endplates 4 disposed at the ends of the stacked battery cells 1, and metal bands 5 disposed at battery block 2 side-walls extending in the stacking direction of the battery cells 1 and connected at both ends to the endplates 4 to hold the battery cells 1 in a stack. An insulating separator 15 has an insulating plate section 15X that intervenes between adjacent battery cells 1, and insulating walls 15C connected to the insulating plate section 15X that cover both battery cell 1 side-walls and are disposed between the battery cell 1 outer side-walls and the metal bands 5. These insulating walls 15C and the insulating plate section 15X are formed from plastic as a single-piece. In this battery system, insulating plate sections 15X are sandwiched between battery cells 1, and the insulating walls 15C are disposed between battery cell 1 outer side-walls and metal bands 5 to insulate the battery cells 1 from the metal bands 5.

The battery system described above has the characteristic that while the metal bands are put in close proximity to battery cell outer side-walls, short circuits between battery cells and the metal bands can be reliably prevented. Further, the insulating walls, which electrically isolate the metal bands and the battery cell outer side-walls, are formed as a single-piece with the plastic insulating separators, which electrically isolate adjacent battery cells. Therefore, the battery system described above has the characteristic that the insulating walls can be disposed in accurate locations without shifting position via the insulating separators, and the battery cells can be reliably insulated from the metal bands.

In the battery system of the present invention, an insulating separator 15 can be provided with insulating walls 15C formed as a single-piece with the insulating plate section 15 and connected to the edges on both sides of the insulating plate section 15X. Battery cells 1 can fit between the insulating walls 15C on both sides of the insulating plate section 15X. By disposing battery cells between the insulating walls of this battery system, battery cells can be stacked with insulating separators in specified locations without shifting position. Consequently, the battery cells can be stacked via the insulating separators while preventing lateral position shift of the battery cells.

In the battery system of the present invention, an insulating separator 15 can be provided with insulating walls 15C formed as a single-piece with the insulating plate section 15 and connected to the top and bottom of the edges on both sides of the insulating plate section 15X. Top and bottom insulating walls 15C connect to vertical sections 15y that cover battery cell 1 outer side-walls. Horizontal sections 15x that cover battery cell 1 upper and lower surfaces are formed as a single-piece, and battery cells 1 can fit inside the vertical sections 15y and horizontal sections 15x. By disposing battery cells inside the insulating walls of this battery system, battery cells can be stacked with insulating separators while preventing battery cell lateral and vertical position shift. Consequently, the battery cells can be stacked via the insulating separators while preventing lateral or vertical position shift.

In the battery system of the present invention, insulating walls 15C can be established to project from both surfaces of an insulating plate section 15X and these insulating separators 15 can be formed as a single-piece. By fitting battery cells inside the insulating walls projecting from both surfaces of the insulating separators in this battery system, battery cells can be stacked on either side of an insulating separator without shifting position. Consequently, while all the battery cells can be stacked without shifting position via insulating separators, the insulating separators can also be disposed in fixed positions.

In the battery system of the present invention, air passage-way slits 77 can be established between the insulating walls 75C of adjacently stacked insulating separators 75. In this battery system, battery cell external cases can be efficiently cooled via the air passage-way slits established between insulating walls. This is because external case surfaces exposed through the air passage-way slits can be directly cooled by a cooling medium such as a cooling gas.

The battery cells 1 of the battery system of the present invention can be lithium ion batteries. This battery system has the characteristics that the outline can be compact, and while light-weight, the capacity can be high. The above and further objects of the present invention as well as the features thereof will become more apparent from the following detailed description to be made in conjunction with the accompanying drawings.

DETAILED DESCRIPTION OF THE INVENTION

Although the battery system of the present invention is not restricted to a specific application, it is primarily suitable as a car power source apparatus for use on-board an electrically driven vehicle such as a hybrid car or electric automobile to supply power to a driving motor.

Figure 1:
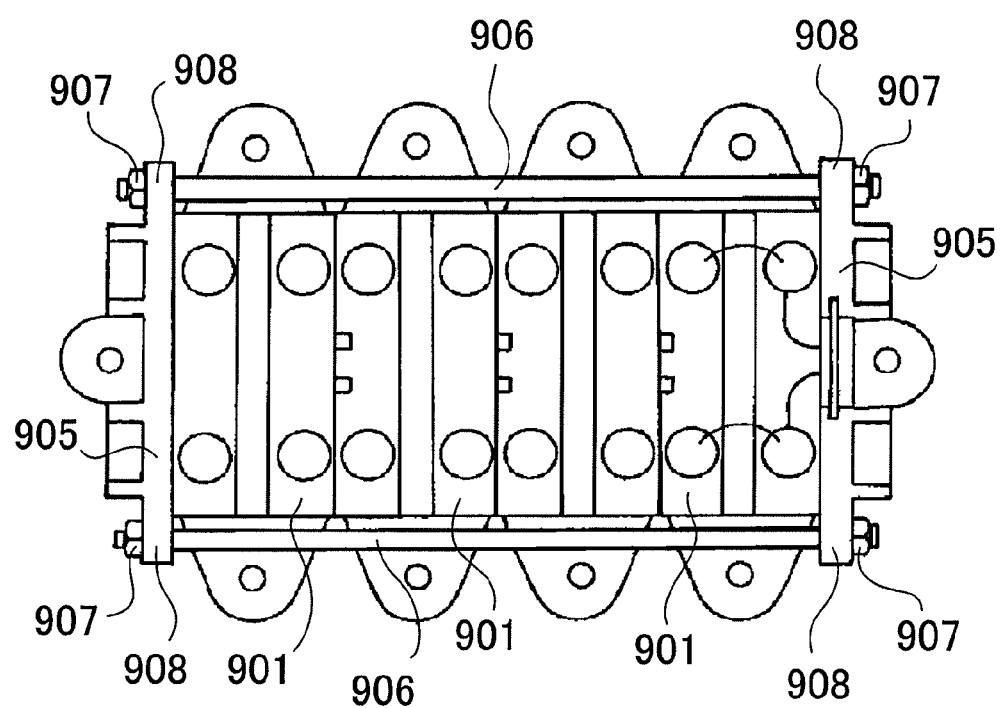
FIG. 1 is a plan view of a prior art battery system.
Figure 2:
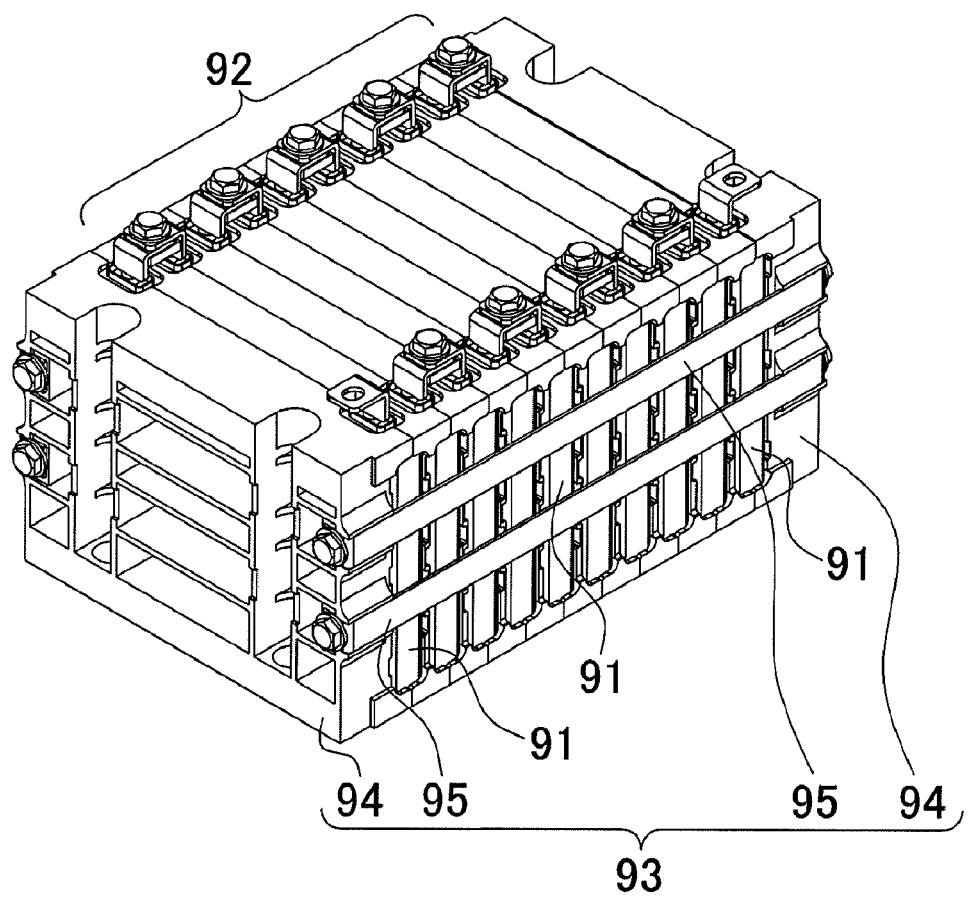
FIG. 2 is an oblique view of a battery system previously developed by the present applicant.
Figure 3:
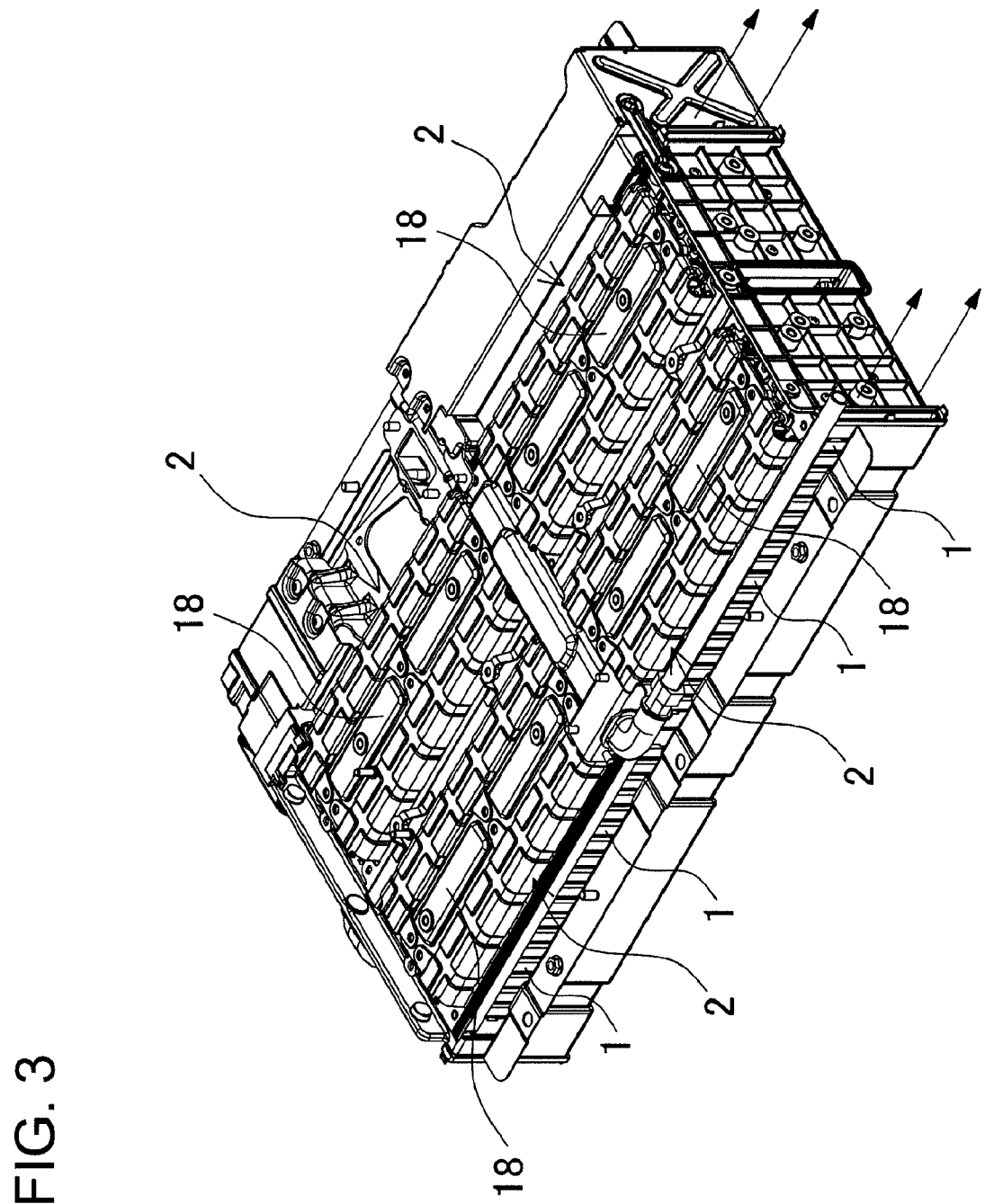
FIG. 3 is an oblique view of a car power source apparatus equipped with a battery system for an embodiment of the present invention.
Figure 4:
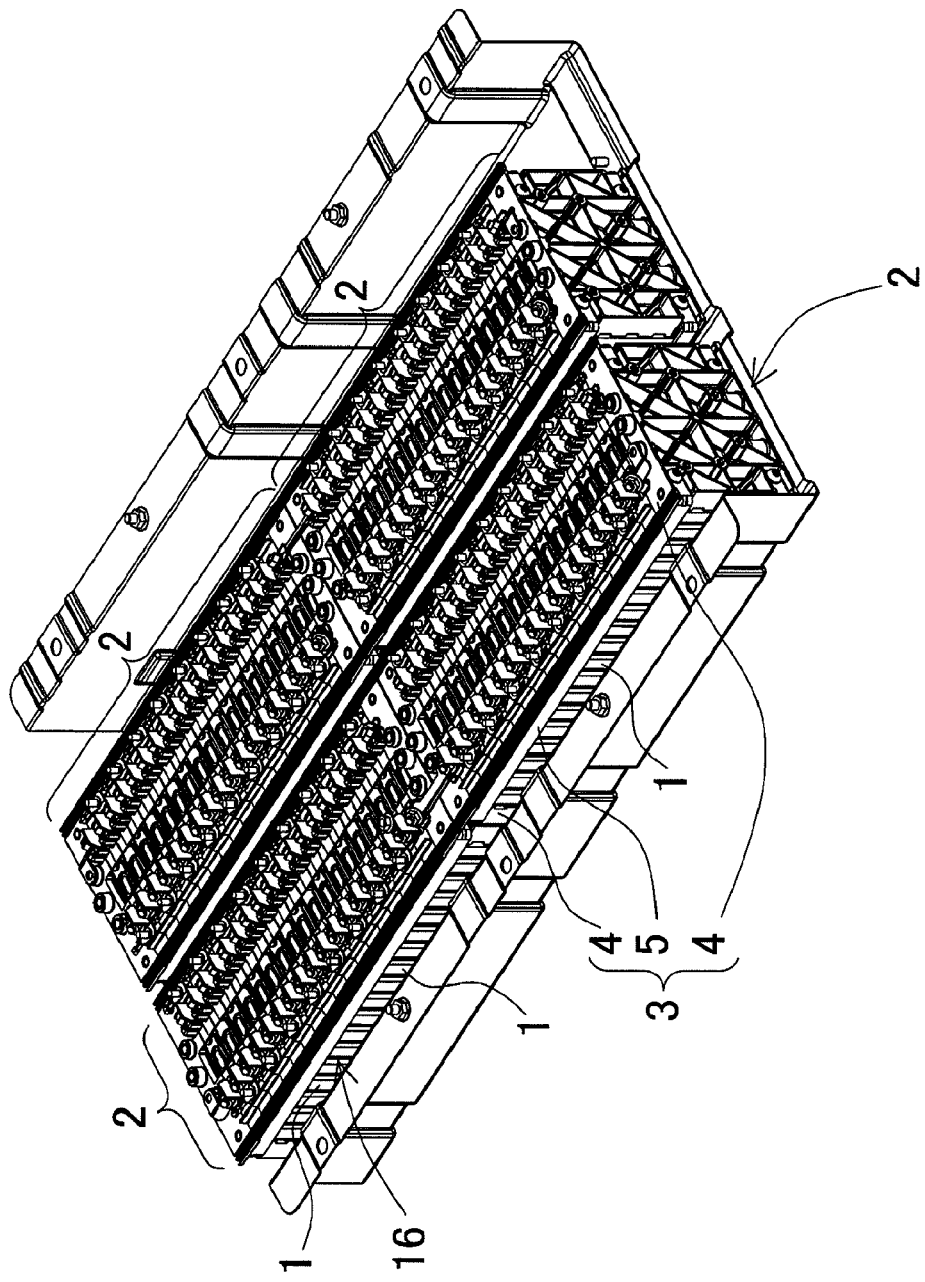
FIG. 4 is an oblique view of the car power source apparatus battery system shown in FIG. 3.

FIGS. 3-8 show battery systems for embodiments of the present invention. FIGS. 3 and 4 show a car power source apparatus provided with four battery system units, and FIGS. 5-8 show the battery system employed in that power source apparatus.

The battery system shown in these figures is provided with a battery block 2 having a plurality of stacked battery cells 1 that are rectangular batteries, and fastening components 3 that hold the battery cells 1 of the battery block 2.

Figure 9:
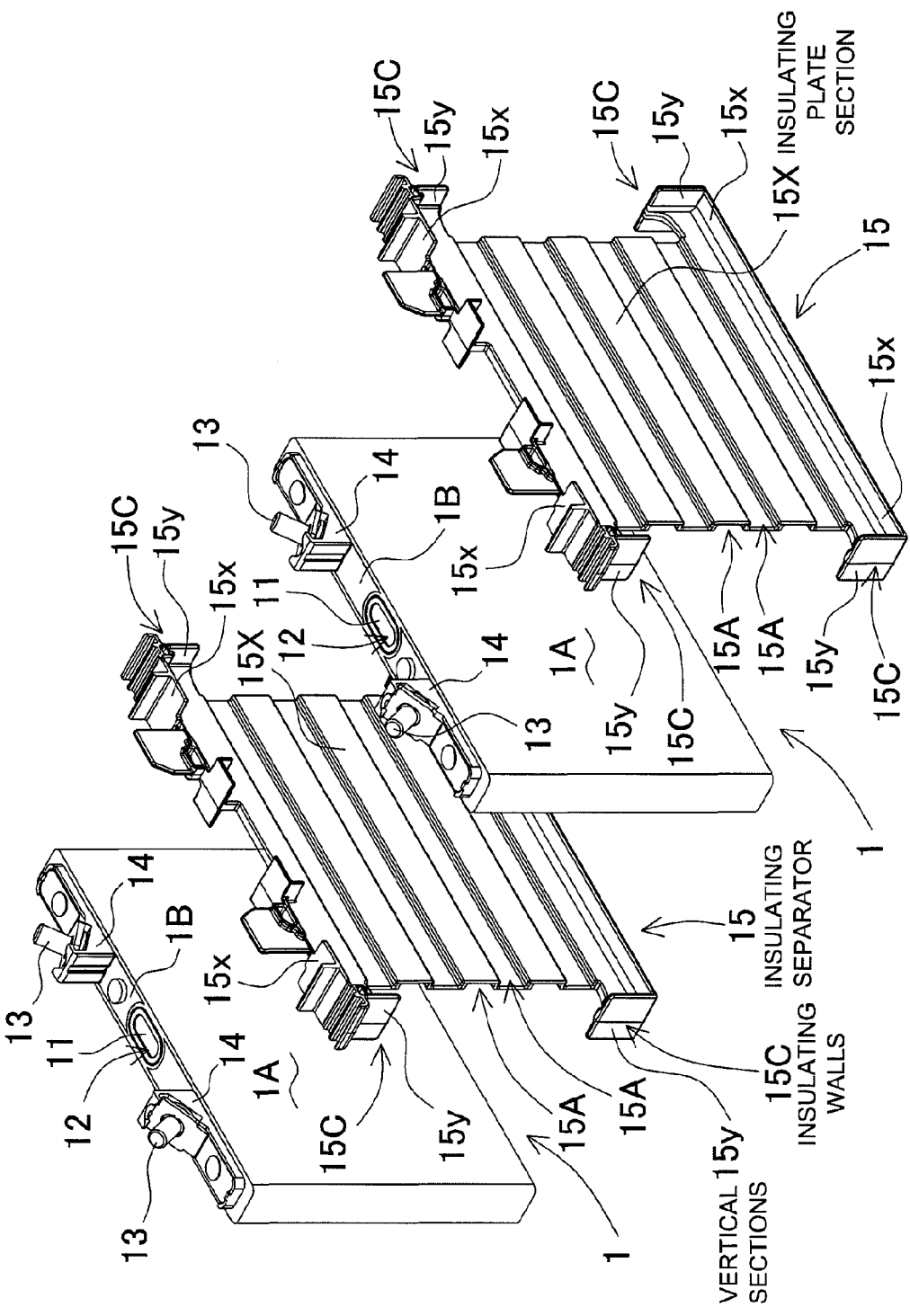
FIG. 9 is an exploded oblique view showing the stacking configuration of the battery cells and insulating separators.

The rectangular battery cells 1 are lithium ion batteries. However, rectangular battery cells are not limited to lithium ion batteries and any rechargeable batteries, such as nickel hydride batteries can be used. A rectangular battery has an electrode unit, which is a stack of positive and negative electrode plates, contained in a casing filled with electrolyte. As shown in FIG. 9, the casing has an external case 1A shaped as a rectangular cylinder with a closed bottom and an open top region that is closed off by a sealing plate 1B. The external case 1A is made of sheet metal such as aluminum or aluminum alloy, and is shaped by an impact press. The casings for rectangular batteries that are stacked together are formed with a thin rectangular shape. The sealing plate 1B is also made from sheet metal such as aluminum or aluminum alloy. The sealing plate 1B has positive and negative electrode terminals 13 mounted at both ends via insulating material 14. The positive and negative electrode terminals 13 are connected to the positive and negative electrode plates housed inside. The metal external case 1A of a lithium ion battery is not connected to an electrode via a wire-lead. However, since the external case 1A connects to the electrodes through the electrolyte solution, it attains a potential intermediate to that of the positive and negative electrodes. Further, one electrode terminal of the rectangular battery can also be connected to the external case via a wire-lead. In this rectangular battery, the electrode terminal connected to the external case can be mounted on the sealing plate without insulation. In addition, the sealing plate 1B is provided with a safety valve 11 opening 12. The safety valve 11 opens to prevent damage to the casing if internal pressure becomes greater than a set value. If the safety valve 11 opens, internal gas is discharged to the outside through the opening 12 in the sealing plate 1 B. In the rectangular batteries of the figures, the safety valve 11 opening 12 is provided in the sealing plate 1B. This external case 1A can discharge gas from the opening 12 of an open safety valve 11. This is because gas accumulates inside the casing. A safety valve opening can also be established on a bottom or side surface of the external case. However, when this type safety valve opens, electrolyte solution is discharged. If electrolyte solution, which is a conducting liquid, is discharged, it can short circuit material that it contacts. A rectangular battery with the safety valve 11 established in the sealing plate 1B of the casing reduces internal pressure by discharging gas from an open safety valve 11. Consequently, when the safety valve 11 opens, electrolyte solution discharge is restrained and detrimental effects due to the release of electrolyte solution are minimized.

The power source apparatus of FIG. 3 is provided with gas exhaust ducts 18 on top of the battery systems to exhaust gas discharged from the safety valves 11 to the outside. Openings in the bottom of a gas exhaust duct 18 connect to safety valve 11 openings 12 to exhaust gas discharged from the safety valves 11 to the outside. In this structure, gas discharged from a rectangular battery with an open safety valve 11 can be quickly exhausted to the outside.

Adjacent electrode terminals 13 of the stacked rectangular batteries are connected via connecting hardware (not illustrated) to connect the batteries in series. In addition, a wire-lead (not illustrated) is connected to the electrode terminals 13 of each rectangular battery. These wire-leads are connected to a circuit board (not illustrated) that implements a protection circuit that detects battery voltage. Although not illustrated, the circuit board is disposed on top of the battery systems in FIGS. 3 and 4.

Rectangular battery cells 1 have insulating separators 15 sandwiched between them. The insulating separators 15 intervene between the battery cells 1 that make up a battery block 2 to insulate the series-connected battery cells 1. In addition to insulating the external cases 1A of adjacent battery cells 1, the insulating separators 15 of FIG. 7 establish cooling gaps 16 between the battery cells 1 to cool the battery cells 1. These insulating separators 15 are fabricated by molding insulating plastic. Each insulating separator 15 of the figure is provided with grooves 15A on both surfaces to establish cooling gaps 16 between the insulating separator 15 and the battery cells 1. In the figure, the insulating separators 15 are provided with grooves 15A extending in the horizontal direction to open on both sides of the battery cells 1. Cooling gaps 16 established by these insulating separators 15 pass air flowing in the horizontal direction to cool the rectangular battery cells 1.

Figure 10:
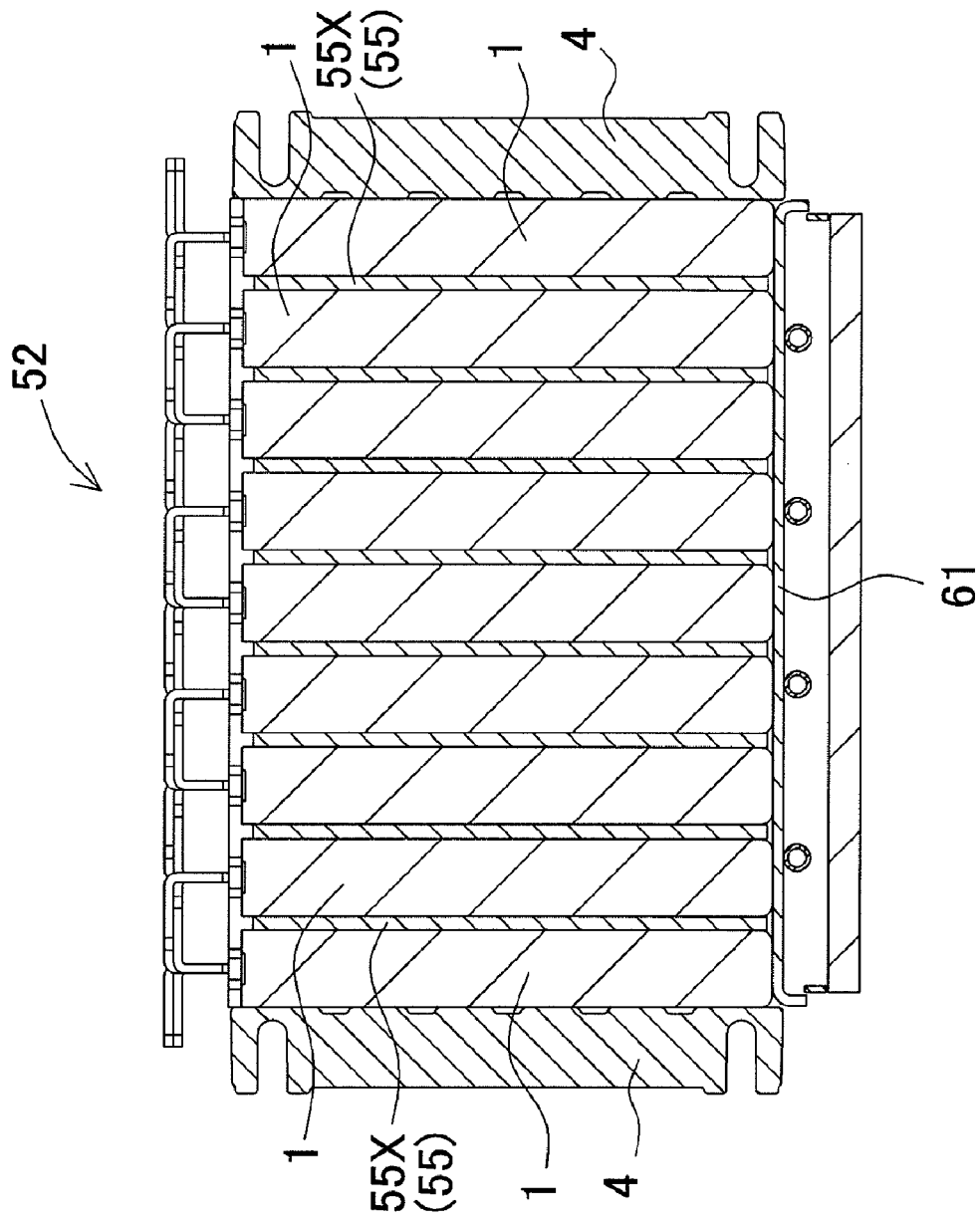
FIG. 10 is a cross-section view of a battery system for another embodiment of the present invention.
Figure 11:
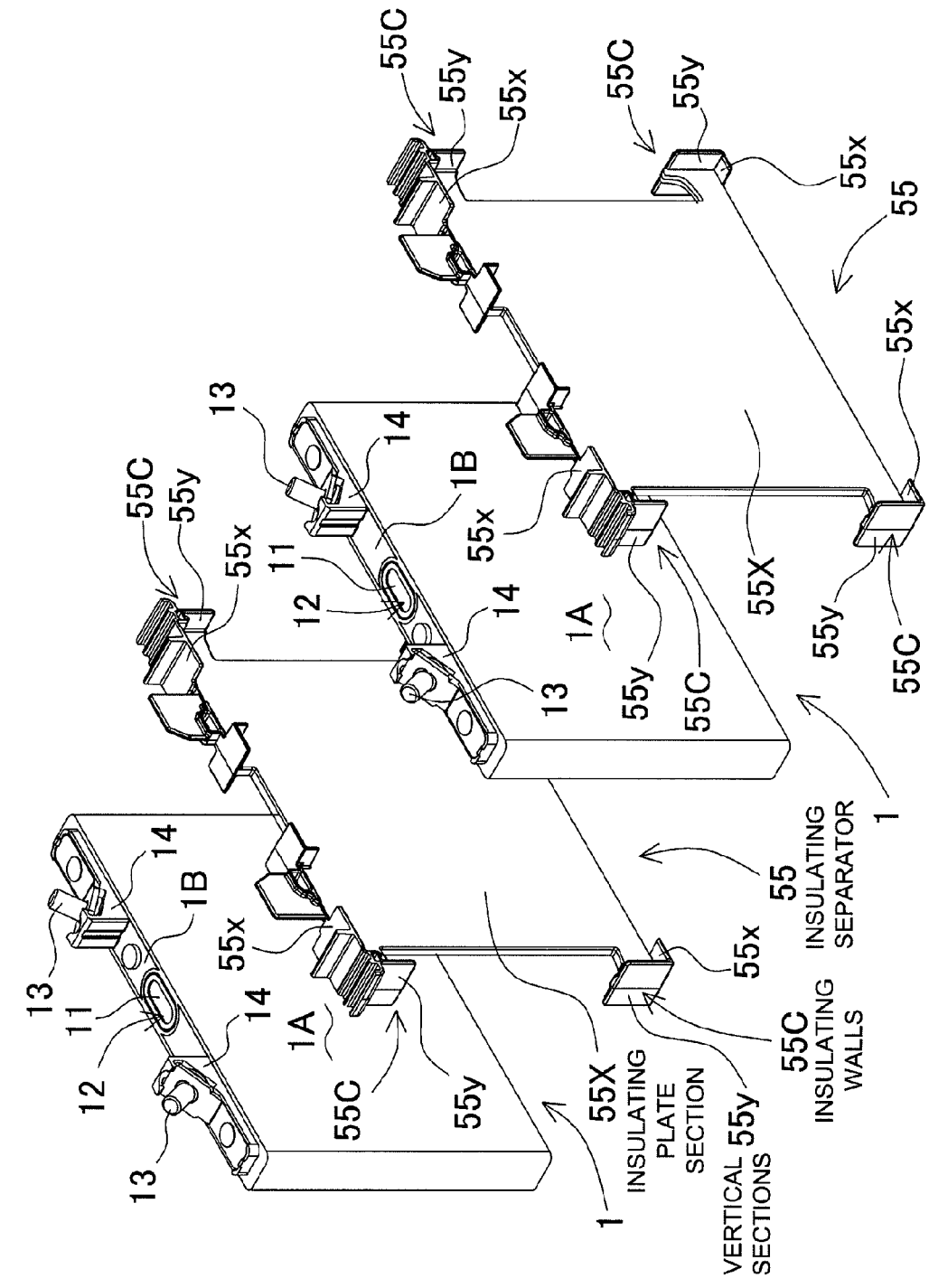
FIG. 11 is an exploded oblique view showing the stacking configuration of the battery cells and insulating separators of the battery system shown in FIG. 10.

Although the insulating separators 15 described above are provided with grooves 15A to cool the battery cells 1, it is not always necessary to provide grooves in the insulating separator surfaces. This is because, as shown in FIGS. 10 and 11, a cooling plate 61 can be attached in thermal contact with the bottom of the battery block 52 to cool the battery cells 1 from below via the cooling plate 61. The insulating separators 55 shown in these figures have planar shaped regions that intervene between battery cells 1 without grooves to establish a configuration that does not have cooling gaps between battery cells.

A plastic insulating separator 15 has an insulating plate section 15X that intervenes between adjacent battery cells 1, and insulating walls 15C connected to the insulating plate section 15X that cover both battery cell 1 side-walls and are disposed between the battery cell 1 outer side-walls and the metal bands 5. The insulating walls 15C and the insulating plate section 15X are formed from plastic as a single-piece insulating separator 15. Insulating plate sections 15X are sandwiched between battery cells 1, and the insulating walls 15C are disposed between battery cell 1 outer side-walls and metal bands 5 to insulate the battery cells 1 from the metal bands 5.

The insulating separator 15 of FIG. 9 is provided with insulating walls 15C, which are connected to the edges on both sides of the insulating plate section 15X, disposed perpendicular to the insulating plate section 15X, and formed as a single-piece with the insulating plate section 15X. An insulating separator 15 has battery cells 1 fit between the insulating walls 15C established at the edges of both sides of the insulating plate section 15C. Specifically, battery cells 1 are inserted into slots established by the insulating plate section 15X and the insulating walls C on both side edges. Insulating separators 15 are disposed in a manner that stacks the battery cells 1 at fixed positions in the insulating separators 15.

Insulating walls 15C are formed as a single-piece connected to the top and bottom of both edges of an insulating plate section 15X to make an insulating separator 15. Vertical sections 15y that cover battery cell 1 outer side-walls, and connected horizontal sections 15x that cover battery cell 1 top and bottom surfaces are formed as a single-piece to establish the upper and lower insulating walls 15C. Upper insulating walls 15C cover battery cell 1 top surfaces with horizontal sections 15x, and lower insulating walls 15C cover battery cell 1 bottom surfaces with horizontal sections 15x. Battery cell 1 corner regions are disposed inside the L-shaped insulating walls 15C formed by the vertical sections 15y and horizontal sections 15x of the insulating separator 15 to fit the battery cells 1 in fixed positions without shifting vertically or horizontally. Specifically, insulating separators 15 and battery cells 1 can be stacked without shifting position. Further, since vertical sections 15y and horizontal sections 15x of the L-shaped insulating walls 15C are mutually reinforcing and prevent deformation, a thin but strong structure can be achieved. Similarly, the insulating separators 55 shown in FIGS. 10 and 11 have the same structure as the embodiment above. In FIGS. 10 and 11, 55C are the insulating walls, 55x are the horizontal sections, 55y are the vertical sections, and 55X are the insulating plate sections.

Although not illustrated, insulating walls can have a plurality of rows of ribs extending in the vertical direction inside the vertical sections and formed as a single-piece with the insulating separator. This structure can absorb battery cell dimensional differences in the width direction. This is because the ribs can deform in contact with battery cell surfaces. Similarly, insulating walls can also have a plurality of rows of ribs extending in the horizontal direction inside the horizontal sections and formed as a single-piece with the insulating separator. This structure can absorb battery cell dimensional differences in the vertical direction.

Figure 8:
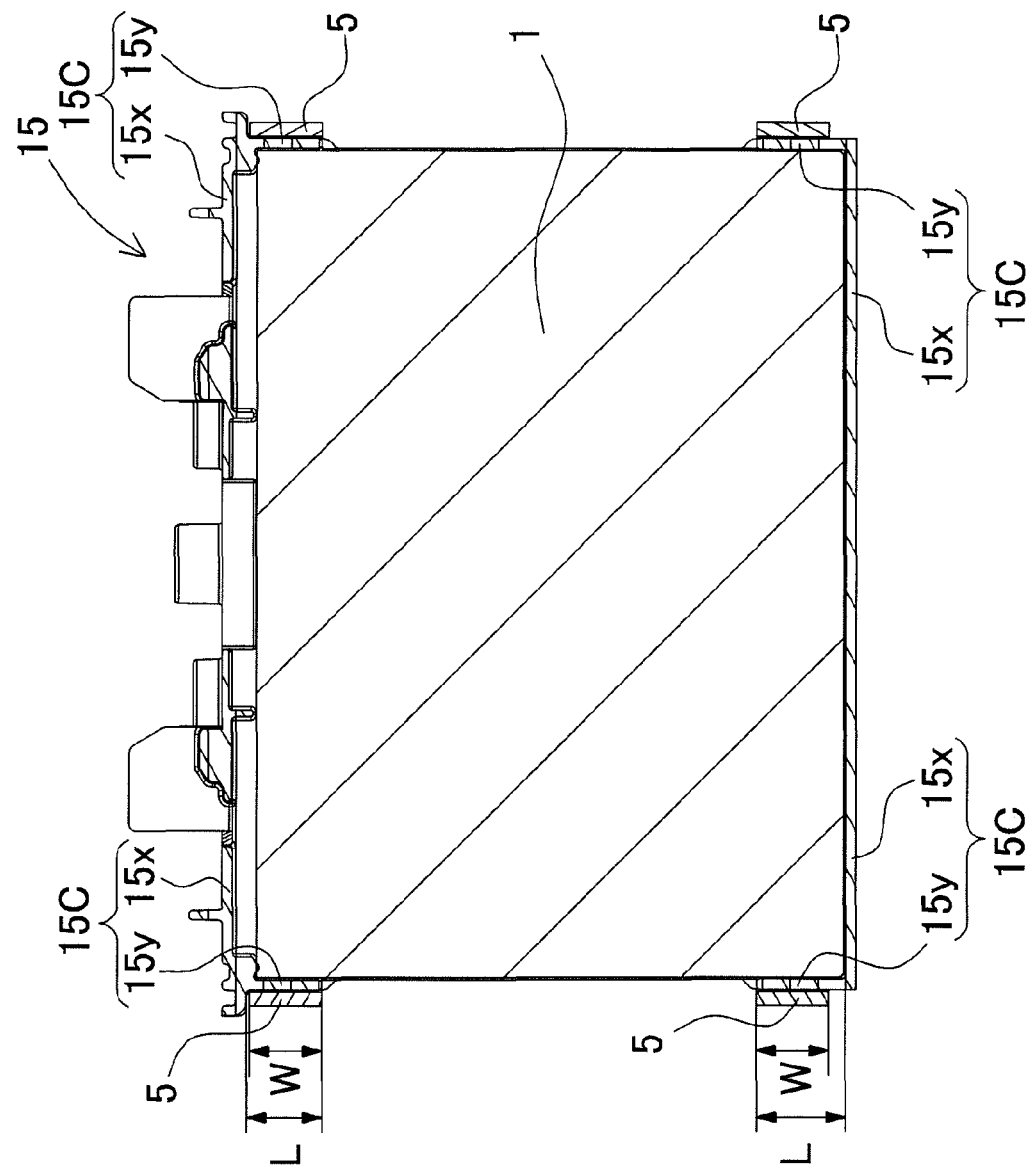
FIG. 8 is a cross-section view through the line A-A of the battery system shown in FIG. 7.

The vertical sections 15y of the insulating walls 15C are disposed between battery cell 1 outer side-walls and the metal bands 5. The vertical length (L) of a vertical section 15y in FIG. 8 is formed equal to or longer than the metal band 5 width (W). This insulating separator 15 can insulate the entire width of a metal band 5 with an insulating wall 15C. Consequently, the battery cells 1 can be insulated from the metal bands 5 with an ideal configuration. However, the vertical length (L) of the vertical section of an insulating wall does not necessarily have to be greater than or equal to the metal band width (W). This is because a gap is created between a battery cell outer side-wall and metal band by disposing an insulating wall vertical section between the battery cell outer side-wall and metal band, and the battery cell is insulated from the metal band via that gap.

The insulating walls 15C of an insulating separator 15 are formed thin and preferably approximately 0.5 mm. This insulating separator 15 reduces the gap between the metal bands 5 and the battery cells 1, and allows the metal bands 5 to be put in close proximity with battery block 2 surfaces. An insulating separator 15 with vertical section 15y vertical length (L) greater than or equal to the metal band 5 width (W) can be formed with thin vertical sections 15y and still reliably insulate the battery cells 1 from the metal bands 5. Consequently, this type of insulating separator 15 can insulate battery cells 1 from the metal bands 5 with vertical sections 15y thinner than 0.5 mm. For example, the thickness of vertical sections 15y can be greater than or equal to 0.3 mm. Conversely, an insulating separator 15 formed with thicker insulating walls 15C, for example 0.5 mm to 2 mm, and preferably 0.5 mm to 1 mm, can insulate battery cells 1 from the metal bands 5 with vertical section 15y vertical length (L) shorter than the metal band 5 width (W). This is because the gap between battery cell 1 outer side-walls and the metal bands 5 is wider.

The insulating separators 15 of FIGS. 5-9 are provided with insulating walls 15C formed in single-piece construction projecting from the surfaces on both sides of the insulating plate sections 15X. Battery cells 1 are disposed inside the L-shaped vertical sections 15y and horizontal sections 15x of the insulating walls 15C projecting from both sides of an insulating plate section 15X. This insulating separator 15 can fit battery cells 1 aligned in spaces on both sides without shifting position vertically or horizontally. Consequently, many of these insulating separators 15 and battery cells 1 can be stacked without horizontal or vertical position shift to form a battery block 2.

The insulating walls 15C projecting from both surfaces of the insulating plate section 15X of an insulating separator 15 can have widths that project to half the battery cell 1 width. These insulating walls 15C can insulate battery cells 1 from the metal bands 5 without exposing battery cell 1 outer side-walls. This is because these insulating separators 15 can be stacked with battery cells 1 disposed on the insulating separator 15 surfaces to establish a stack with no gaps between the insulating walls 15C of adjacent insulating separators 15. These insulating separators 15 can reliably insulate battery cell 1 outer side-walls from the metal bands 5 via the insulating walls 15C.

Figure 12:
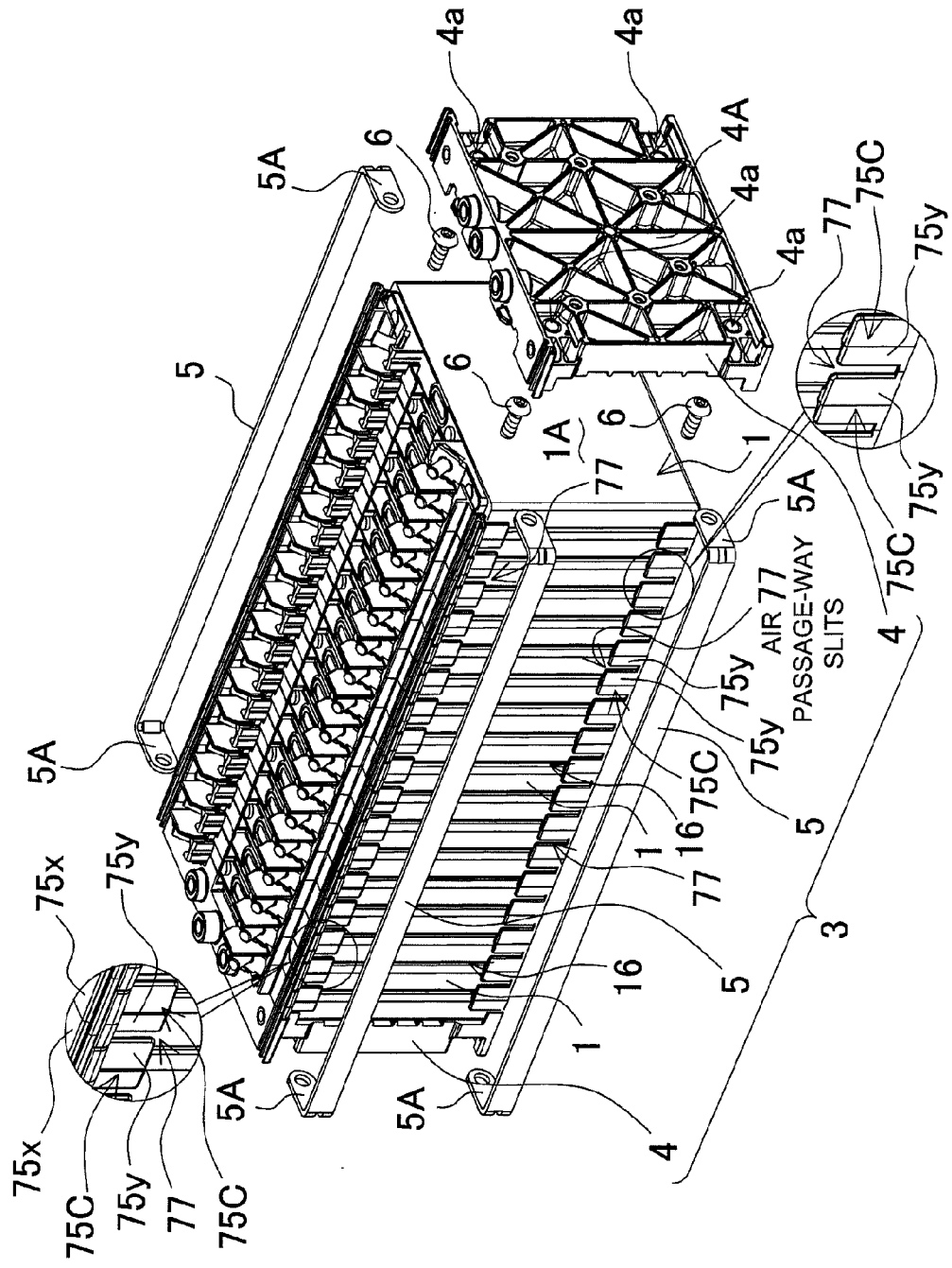
FIG. 12 is an oblique view with key elements enlarged of a battery system for another embodiment of the present invention.
Figure 13:
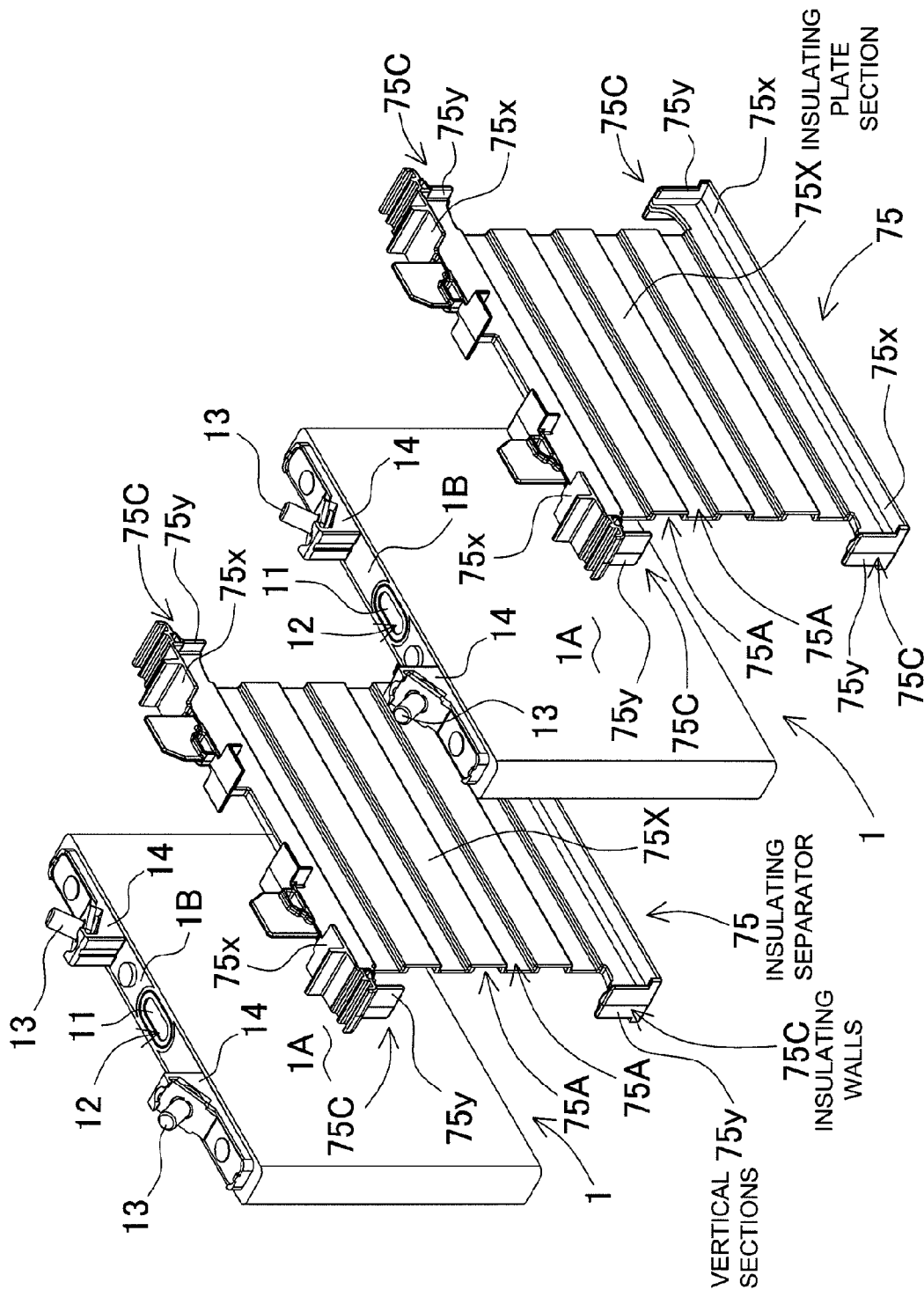
FIG. 13 is an exploded oblique view showing the stacking configuration of the battery cells and insulating separators of the battery system shown in FIG. 12.

As shown in FIGS. 12 and 13, the insulating walls 75C projecting from both surfaces of the insulating plate section 75X of an insulating separator 75 can have widths that project to less than half the battery cell 1 width. These insulating walls 75C can insulate battery cells 1 from the metal bands 5 while exposing part of the battery cell 1 outer side-walls. These insulating separators 75 can be stacked with battery cells 1 disposed on the insulating separator 75 surfaces to establish air passage-way slits 77 between the insulating walls 75C of adjacent insulating separators 75. Battery cells 1 exposed through the air passage-way slits 77 can be effectively cooled by cooling gas flow through the air passage-way slits 77. Battery cells 1 can be cooled by cooling gas even in battery cell 1 surfaces opposite the metal bands 5. In FIGS. 12 and 13, 75A are grooves, 75C are insulating walls, 75x are horizontal sections, 75y are vertical sections, and 75X are insulating plate sections.

Rectangular battery cells 1 stacked with intervening insulating separators 15 are held in fixed positions by the fastening components 3. The fastening components 3 are a pair of endplates 4 disposed at the end planes of the rectangular battery stack, and metal bands 5 with ends connected to the endplates 4 to hold the stack of rectangular batteries in a compressed state.

Figure 5:
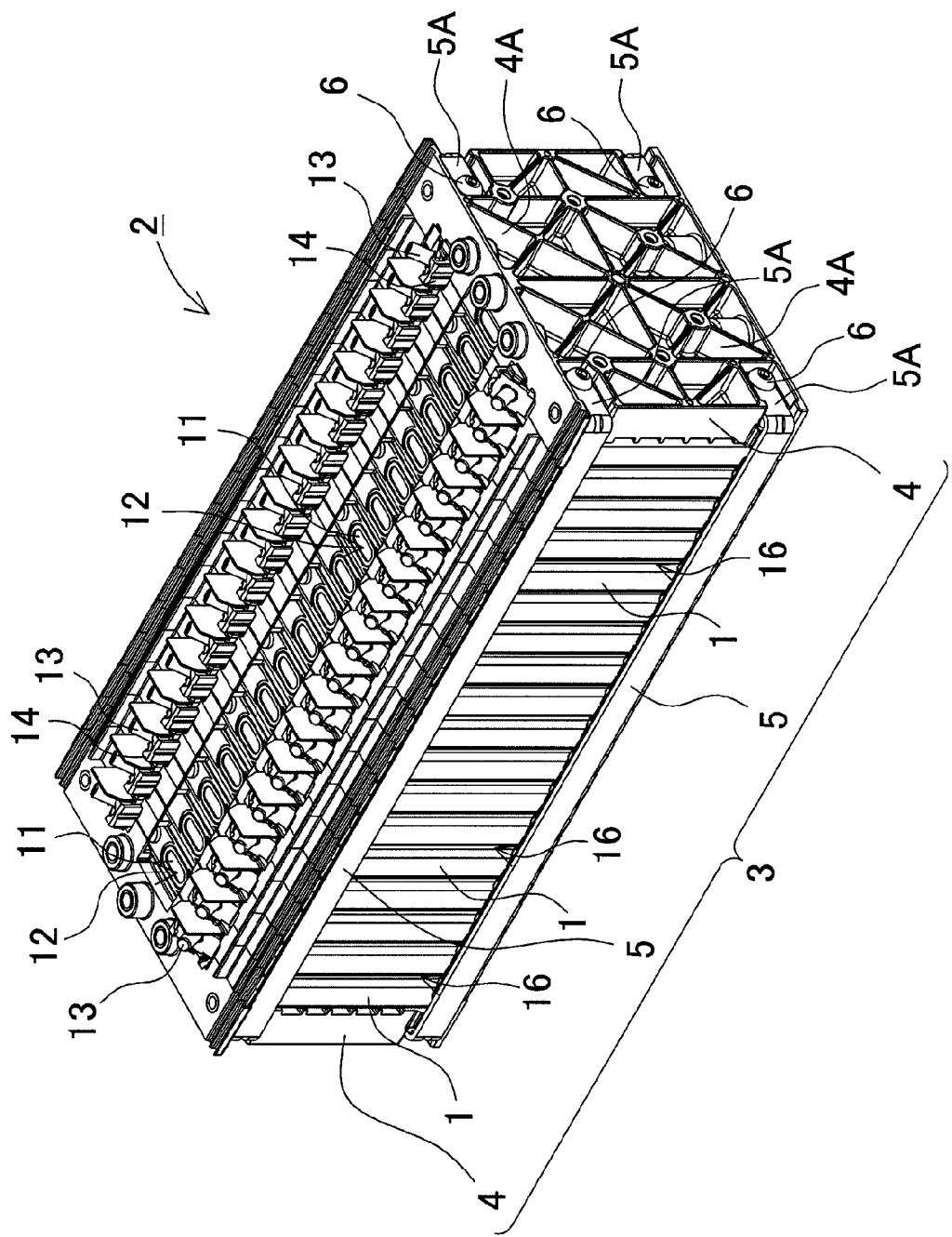
FIG. 5 is an oblique view of a battery system for an embodiment of the present invention.
Figure 6:
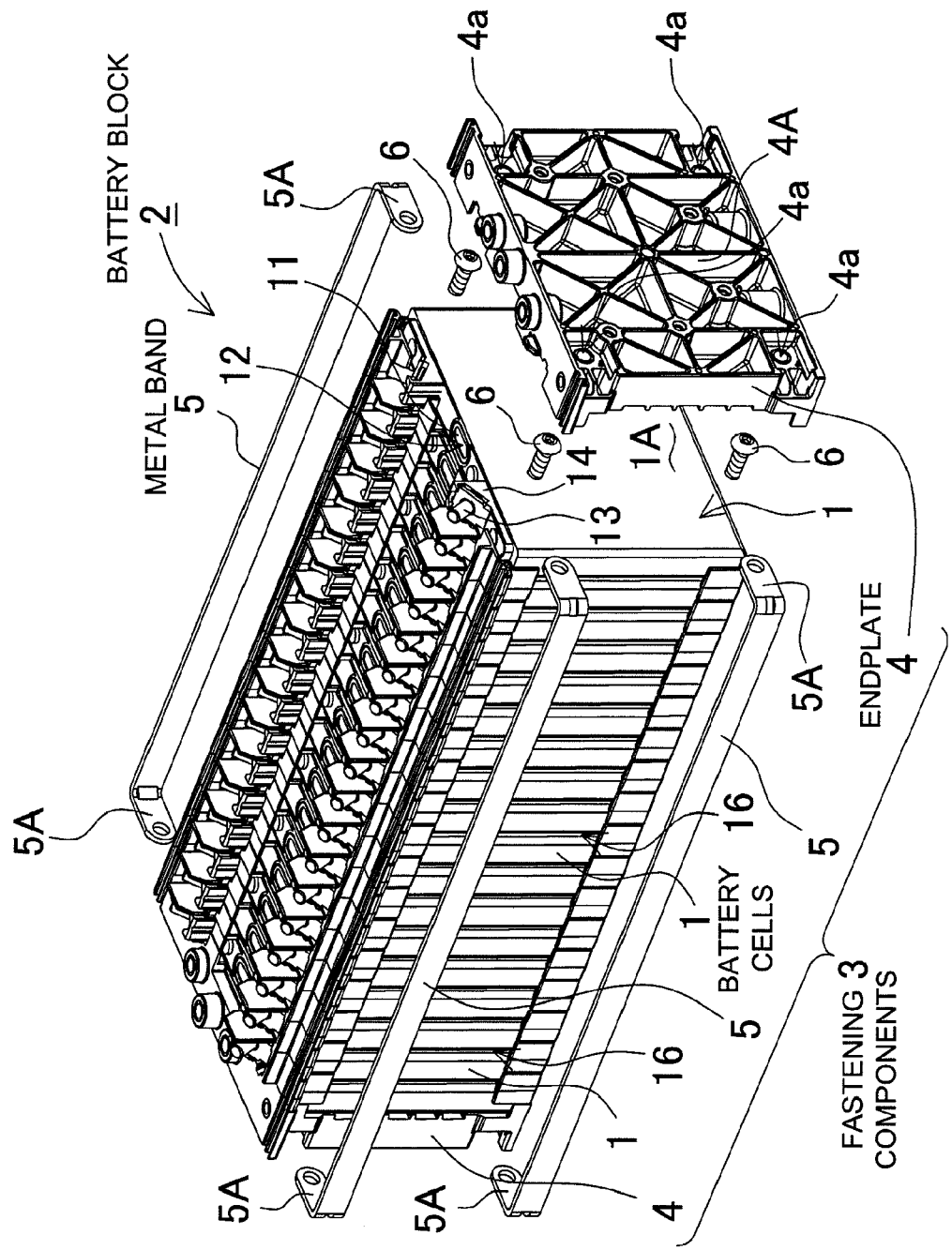
FIG. 6 is an exploded oblique view of the battery system shown in FIG. 5.
Figure 7:
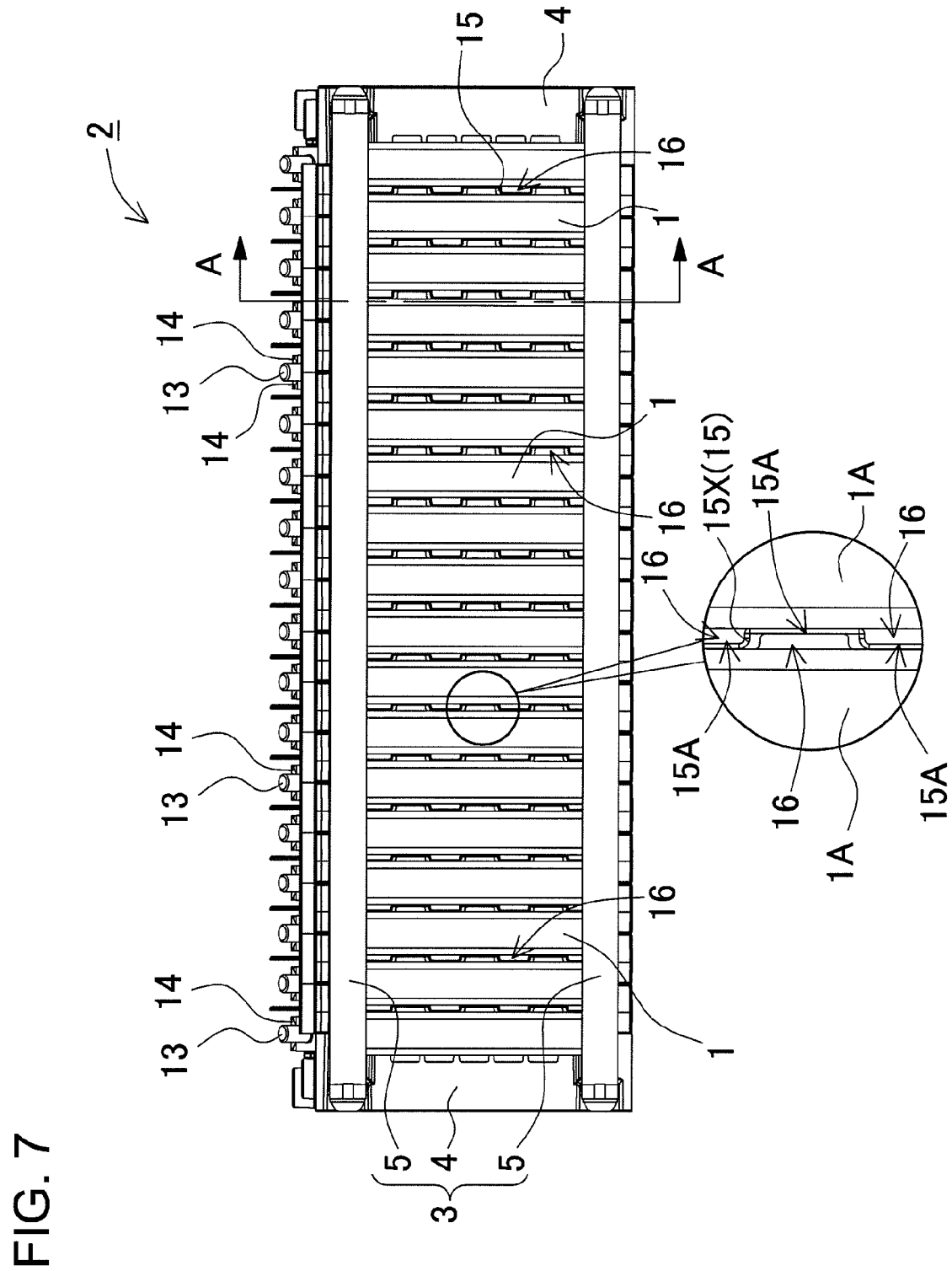
FIG. 7 is a side view of the battery system shown in FIG. 5.

The endplates 4 are made of aluminum or an alloy of aluminum, or they are molded from hard plastic. The endplates 4 of FIGS. 5 and 6 are provided with reinforcing ribs 4A extending vertically and horizontally on the outside surface and formed in single-piece construction with the endplates 4. The bending strength of these endplates 4 is strengthened by the reinforcing ribs 4A. Endplates 4 with exceptional bending strength can effectively prevent expansion at the center regions of rectangular batteries. This is because rectangular battery center region expansion will not occur as long as the endplates 4 connected by metal bands 5 do not distort. To sandwich the rectangular batteries over a wide area, endplates 4 are made with external shapes that are the same rectangular shape as the rectangular battery cells 1. The rectangular endplates 4 are made the same size as the rectangular batteries or very slightly larger than the rectangular batteries. Further, the endplates 4 of the figures are provided with grooves in the sides opposite battery cells 1 for cooling air flow, and those grooves establish cooling gaps 16 between the endplates 4 and the rectangular batteries. However, surfaces of the endplates opposite the battery cells can also be flat planar surfaces and those planar surfaces can be put in contact with the surfaces of rectangular batteries or insulating separators. Plastic endplates 4 can be stacked directly on rectangular batteries, while metal endplates are stacked on rectangular batteries via stacking material.

The ends of the metal bands 5 are connected to the endplates 4. The ends of the metal bands 5 are connected to the endplates 4 by set screws 6, or the end regions are folded inward to connect to the endplates, or nuts are threaded on at the ends of the metal bands, or the ends of the metal bands are connected to the endplates by snapping or crimping into latches. An endplate 4 that connects with metal bands 5 via set screws 6 is provided with screw-holes 4a to accept the set screws 6. The screw-holes 4a are provided in the outer surface of an endplate 4, and set screws 6 passing through bent regions 5A of the metal bands 5 are screwed into those screw-holes 4a to connect the metal bands 5.

The battery system of FIGS. 5 and 6 has first metal bands 5 disposed along the upper ends of the rectangular battery cells 1 and second metal bands 5 disposed along the lower ends of the rectangular battery cells 1 connected to the endplates 4. In this battery system, screw-holes 4a are established in the upper and lower ends on both sides of the outer surfaces of the endplates 4. This battery system holds the upper and lower parts of the rectangular battery cells 1 with metal bands 5. Screw-holes 4 are provided at locations where the ends of the metal bands 5 are attached to the endplates 4 by set screws 6.

The metal bands 5 are fabricated from sheet metal formed with a prescribed thickness and prescribed width. The ends of the metal bands 5 connect to endplates 4 to join the pair of endplates 4 and hold battery cells 1 in a compressed state between the endplates 4. Metal bands 5 attach with prescribed dimensions to the pair of endplates 4 to retain battery cells 1 stacked between the endplates 4 in a prescribed state of compression. If the metal bands 5 stretch with battery cell 1 expansion pressure, battery cell 1 expansion cannot be prevented. Therefore, metal bands 5 are made from sheet metal strong enough to avoid stretching with battery cell 1 expansion pressure, and are formed with a width and thickness for sufficient strength from stainless steel such as SUS304, steel, or other sheet metal. Further, metal bands can also be formed with side-walls in the shape of channels or rails. Since metal bands with this shape can improve bending strength, they have the characteristic that stacked rectangular batteries can be robustly retained in a prescribed state of compression while reducing the metal band width.

A metal band 5 is provided with bent regions 5A at its ends, and these bent regions 5A are connected to the endplates 4. Set screw 6 through-holes are established in the bent regions 5A, and the metal bands 5 are attached to the endplates 4 via set screws 6 inserted through the through-holes.

Although not illustrated, a single long metal band can be bent at its mid-region to connect the bent region around the outer surface of one endplate and connect both ends to the other endplate. This type of metal band can be sturdily connected to one endplate at its bent mid-region that loops around that endplate. Further, the metal band can also be attached to that endplate in single-piece construction. This type of metal band can be attached to one endplate with maximum robustness.

The battery system of FIGS. 5-8 described above is assembled in the following manner.

[Battery Block Compression Process]

Insulating separators 15 are disposed between the battery cells 1, which are rectangular batteries. The insulating separators 15 and battery cells 1 are stacked to form a battery block 2, and endplates 4 are disposed at both ends of the battery block 2. In this configuration, both endplates 4 are pressed and held in a holder tool. The unit is compressed until a prescribed dimension is established between the endplates 4, and this configuration is maintained.

[Metal Band Attachment Process]

The battery block 2 is retained in the compressed state and both ends of the metal bands 5 are attached to the endplates 4. The metal bands 5 of the figures have bent regions 5A with through-holes provided at both ends. These metal bands 5 are attached to the endplates 4 by screwing set screws 6 inserted through the through-holes in the bent regions 5A into screw-holes 4a in the endplates 4.

[Holder Tool Removal Process]

After all the metal bands 5 have been attached to the endplates 4, the holder tool is removed. By the assembly process described above, stacked battery cells 1, which are rectangular batteries, are maintained in a compressed state between a pair of endplates 4. Consequently, even if battery cells 1 have a tendency to expand due to a condition such as over-charging, the distance between endplates 4 does not change, and battery cell 1 expansion is prevented by the endplates 4. In this battery system, since both ends of the metal bands 5 are attached to the endplates 4 by set screws 6, metal bands 5 are robustly connected to the endplates 4, and prescribed dimensions are maintained between endplates 4 via the metal bands 5.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2008-335517 filed in Japan on Dec. 27, 2008, the content of which is incorporated herein by reference.

What is claimed is:

1. A battery system comprising:
   a battery block having a plurality of stacked battery cells that are rectangular batteries and are connected in series;
   insulating separators made of plastic and sandwiched between the battery cells that make up the battery block to insulate the battery cells; and
   fastening components that hold the battery cells of the battery block;
   wherein the fastening components comprise:
      a pair of endplates disposed at the ends of the stacked battery cells; and
      metal bands disposed at battery block side-walls extending in a stacking direction of the battery cells and connected at both ends to the endplates to hold the battery cells in a stack;
   wherein each insulating separator comprises:
      an insulating plate section that intervenes between adjacent battery cells; and
      insulating walls connected to the insulating plate section that cover side walls of the battery cells;
   wherein the insulating walls and the insulating plate section are formed from insulating plastic as a single piece,
   wherein insulating plate sections are sandwiched between battery cells, and the insulating walls are disposed between battery cell outer side-walls and metal bands to insulate the battery cells from the metal bands, and
   wherein at least part of the outer side-walls of one of the battery cells is covered with the insulating walls of adjacently stacked insulating separators which said one of the battery cells is disposed between.

2. The battery system of claim 1, wherein the insulating walls of each insulating separator are connected to edges on both sides of the respective insulating plate section; and
wherein battery cells are fit between the insulating walls on both sides of the insulating separator.

3. The battery system of claim 2, wherein the insulating walls of each insulating separator are disposed at upper and lower ends on both sides of the respective insulating plate section.

4. The battery system of claim 3, wherein the insulating walls of each insulating separator include vertical sections that cover battery cell outer side-walls and horizontal sections that cover battery cell upper and lower surface;
wherein the vertical sections, the horizontal sections, and the insulating plate section of each insulating separator are formed as a single piece; and
wherein the battery cells are disposed inside the vertical sections and horizontal sections.

5. The battery system of claim 4, wherein the vertical length (L) of the vertical sections is greater than or equal to the width (W) of the metal bands.

6. The battery system of claim 4, wherein the thickness of the vertical sections of each insulating separator is less than 0.5 mm.

7. The battery system of claim 4, wherein the thickness of the insulating walls of each insulating separator is 0.5 mm to 2 mm.

8. The battery system of claim 4, wherein the insulating walls project from both surfaces of the insulating plate section of each insulating separator and have widths that project to half the battery cell width, and the battery cells are insulated from the metal bands without exposing battery cell outer side-walls.

9. The battery system of claim 4, wherein the insulating walls of each insulating separator project from both planar surfaces of the insulating plate section.

10. The battery system of claim 1, wherein each of the battery cells has a front side wall facing in the stacking direction of the battery cells, and the outer side walls of each battery cell are substantially orthogonal to the front side wall,
wherein air passage-way slits are established between the insulating walls of adjacently stacked insulating separators, and the air passage-way slits are disposed on the outer side walls of the battery cells.

11. The battery system of claim 10, wherein each of the battery cells has an external case,
wherein the insulating separators insulate the external cases of adjacent battery cells, and establish cooling gaps between the battery cells to cool the battery cells, and
wherein each position of the air passage-way slits is different from each position of the cooling gaps between the battery cells in the stacking direction of the battery cells.

12. The battery system of claim 1, wherein the endplates are made of metal.

13. The battery system of claim 1, wherein the endplates are fabricated by molding hard plastic.

14. The battery system of claim 1, wherein the endplates are provided with reinforcing ribs on their outside surfaces.

15. The battery system of claim 1, wherein the endplate outline is the same rectangular shape as the rectangular batteries of the battery cells.

16. The battery system of claim 1, wherein the endplates are provided with grooves in surfaces opposite the battery cells to establish cooling gaps between the endplates and the battery cells.

17. The battery system of claim 1, wherein the metal bands are connected to the endplates with end sections of the metal bands folded inwards.

18. The battery system of claim 17, wherein the endplates are provided with screw-holes on both sides of the outer surfaces of the endplates.

19. The battery system of claim 1, wherein the battery cells are lithium ion batteries.

20. The battery system of claim 1 installed on-board an electric vehicle as a power source that supplies electric power to a driving motor to drive the vehicle.

* * * * *